United States Patent [19]

Sherwin et al.

[11] Patent Number: 4,711,944
[45] Date of Patent: Dec. 8, 1987

[54] HUMIDITY RESISTANT COATING EMPLOYING BRANCHED POLYMERS OF T-BUTYL ACRYLATE

[75] Inventors: Maynard A. Sherwin, St. Albans; Joseph V. Koleske, Charleston, both of W. Va.

[73] Assignee: Union Carbide Corporation, Danbury, Conn.

[21] Appl. No.: 765,692

[22] Filed: Aug. 15, 1985

Related U.S. Application Data

[63] Continuation of Ser. No. 408,916, Aug. 17, 1982, abandoned.

[51] Int. Cl.⁴ .................. C08F 220/06; C08F 220/28; C08F 220/54
[52] U.S. Cl. ........................... 526/318.42; 526/307.5; 526/307.6; 526/307.7; 526/318.43; 526/320; 526/939; 524/512; 525/162; 525/163; 525/118; 525/119

[58] Field of Search ............. 526/320, 318.42, 318.43, 526/307.5, 307.6, 307.7

[56] References Cited

U.S. PATENT DOCUMENTS

| | | | |
|---|---|---|---|
| 3,850,892 | 11/1974 | Shen et al. | 526/317 |
| 3,926,892 | 12/1975 | Holcombe | 526/320 |
| 4,363,689 | 12/1982 | Roesler | 526/320 |
| 4,440,894 | 4/1984 | Zychowski | 526/318.42 |
| 4,510,284 | 4/1985 | Gimpel | 526/318.43 |

FOREIGN PATENT DOCUMENTS

| | | |
|---|---|---|
| 1556456 | 9/1976 | United Kingdom . |
| 1556463 | 9/1976 | United Kingdom . |
| 1556464 | 9/1976 | United Kingdom . |

*Primary Examiner*—C. Warren Ivy
*Attorney, Agent, or Firm*—J. B. Mauro

[57] ABSTRACT

Coating compositions containing polymers comprising t-butyl acrylate, polyfunctional acrylates, and comonomers containing an active crosslinking site exhibit increased humidity resistance.

9 Claims, No Drawings

HUMIDITY RESISTANT COATING EMPLOYING BRANCHED POLYMERS OF T-BUTYL ACRYLATE

This application is a continuation of application Ser. No. 408,916, filed Aug. 17, 1982, now abandoned.

BACKGROUND OF THE INVENTION

Many coatings are used on surfaces which are employed in an outdoor environment. Such coatings are exposed to sunlight, moisture and the like under a variety of temperature conditions and must, therefore, be able to withstand such changes in climate. Among the preferred weatherable coatings are those based on acrylic polymers. However, after long exposures of time, even these coatings will suffer deterioration at a pace which is dependent upon the geographical area involved.

As a result, several additives have been incorporated into coating formulations to slow down the degradative process by protecting against hydrolytic attack. However, incorporation of such additives increases the cost of producing weatherable coatings. Thus, it would be desirable to produce a highly weatherable coating which did not require the presence of such expensive additives.

In addition, many of the weatherable coatings heretofore employed utilized relatively large amounts of volatile organic solvents. With the rising price of energy, as well as the increased appreciation of the deleterious effects of organic solvents on the environment, it would be desirable to produce a weatherable coating which employs only a minimal amount of volatile organic solvent.

Among the compositions which have been developed in response to such need for highly weatherble coatings are those disclosed in British Pat. Nos. 1,556,456, and 1,556,464 which contain copolymers consisting of 50-75 weight percent t-butyl acrylate; 5-30 weight percent styrene, vinyltoluene or methyl methacrylate; and 4-20 weight precent of acrylonitrile. However, these copolymers, which are cured by crosslinking with an aliphatic dicarboxylic acid, possess high glass transition temperatures as they have a Durran softening point of 90°-120° C. Thus, as is apparent to one skilled in the art, these coatings must be applied as either (1) powders or (2) low-solids solutions as high-solids coatings containing such polymers would be too highly viscous to be utile. Therefore coatings employing these polymers are comparatively uneconomical as the use of powders would necessitate the formation of relatively thick coatings (of at least about 1.5 mil) whereas a low solids solution would require the use of relatively large amounts of solvent.

It has now been surprisingly found that coating compositions which contain low molecular weight copolymers comprised of polyfunctional acrylates and t-butyl acrylate possess unexpectedly superior humidity resistance vis-a-vis coating compositions which do not contain copolymers possessing both of these monomers. Moreover, because of the low molecular weight of the copolymers of this invention, these coating compositions may be formulated in a high solids solution form.

DESCRIPTION OF THE INVENTION

This invention is directed to copolymers and coating compositions contains such copolymers which possess enhanced humidity resistance and thus exhibit desirable weathering properties.

These coating compositions are made up of copolymers comprised of:

(a) from about 10 to about 95 weight percent, preferably from about 25 to about 75 weight percent, most preferably from about 30 to about 60 weight percent, of t-butyl acrylate;

(b) from about 0.1 to about 3 weight percent, preferably from about 0.5 to about 2 weight percent, of polyfunctional acrylates;

(c) from about 1 to about 30 weight percent, preferably from about 5 to about 20 weight percent of functional comonomers containing at least one active crosslinking site, and (d) from 0 to about 80 weight percent, preferably from about 5 to about 60 weight percent, of other ethylenically unsaturated monomers which are capable of polymerizing with t-butyl acrylate and polyfunctional acrylates.

The term polyfunctional acrylate refers to esters of acrylic acid or methacrylic acid which possess two or more ethylenically unsaturated double bonds. Illustrative of such polyfunctional acrylates are diacrylates such as hexane diol diacrylate, tetraethylene glycol diacrylate, and the like; as well as acrylates containing more than two ethylenically unsaturated double bonds such as trimethylolpropane triacrylate, trimethylol propane trimethacrylate, pentaerythritol triacrylate, dipentaerithritol hexacrylate and the like. Further, combinations of these polyfunctional acrylates may be employed. The preferred polyfunctional acrylate is trimethylol propane triacrylate.

The term active crosslinking site refers to a location on the comonomer which is capable of reacting with the crosslinker selected such that a crosslink is produced. Among the preferred active site containing comonomers which may be employed are those which, when reacted with t-butyl acrylate and a polyfunctional acrylate will produce a copolymer possessing active carboxyl, hydroxyl, or amide groups, or mixtures thereof.

Illustrative of such carboxyl group producing monomers are $\alpha,\beta$-unsaturated carboxylic acids such as, for example, acrylic acid, methacrylic acid, $\alpha$-chloroacrylic acid, itaconic acid, crotonic acid, aconitic acid, maleic acid, fumeric acid and the like. Half acid esters of the dicarboxylic acids can also be used, such as methyl hydrogen itaconate, butyl hydrogen itaconate, ethyl hydrogen maleate, and the like. Mixtures of these acids can also be used. The preferred carboxyl group producing monomers are acrylic acid and methyacrylic acid.

Illustrative of active hydroxyl group producing monomers are mono- and polyhydroxy alkyl esters of acrylic acid and methacrylic acid such as
2-hydroxyethyl acrylate and methacrylate,
2-hydroxypropyl acrylate and methacrylate,
3-hydroxypropyl acrylate and methacrylate,
2-hydroxybutyl acrylate and methacrylate,
3-hydroxybutyl acrylate and methacrylate,
4-hydroxybutyl acrylate and methacrylate,
5-hydroxyamyl acrylate and methacrylate,
6-hydroxyhexyl acrylate and methacrylate,
8-hydroxyoctyl acrylate and methacrylate,
2,3-dihydroxypropyl acrylate and methacrylate,
2,3-dihydroxybutyl acrylate and methacrylate and the like. Mixtures of these hydroxyalkyl esters can also be used. The preferred hydroxyalkyl esters are hydroxyethyl acrylate, hydroxyethyl methacrylate, hydroxypropyl acrylate, and hydroxypropyl methacrylate.

Illustrative of active amide group producing monomers are monomers such as acrylamide, methacrylamide and the like.

Illustrative of other ethylenically unsaturated monomers which are capable of polymerizing with t-butyl acrylate and polyfunctional acrylates, and which may be incorporated into the copolymer are acrylic esters and methacrylic esters such as methyl acrylate, ethyl acrylate, propyl acrylate, isopropyl acrylate, butyl acrylate, isobutyl acrylate, sec-butyl acrylate, n-amyl acrylate, isoamyl acrylate, hexyl acrylate, 2-ethylhexyl acrylate, octyl acrylate, 3,5,5-trimethylhexyl acrylate, decyl acrylate, dodecyl acrylate, hexadecyl acrylate, octadecyl acrylate, octadecenyl acrylate, n-amyl methacrylate, sec-amyl methacrylate, hexyl methacrylate, 2-ethylbutyl methacrylate, octyl methacrylate, 3,5,5-trimethylhexyl methacrylate, decyl methacrylate, dodecyl methacrylate, hexadecyl methacrylate, octadecyl methacrylate, butoxyethyl acrylate or methacrylate or other alkoxyethyl acrylate or methacrylate, methyl methacrylate, ethyl methacrylate, propyl methacrylate, isopropyl methacrylate, butyl methacrylate, sec-butyl methacrylate, and t-butyl methacrylate, t-amyl methacrylate, t-amyl acrylate, cyclohexyl acrylate or methacrylate, and the like; as well as other $\alpha,\beta$-ethylenically unsaturated monomers, such as ethylene, butadiene, vinyl chloride, vinylidene chloride, vinyl acetate, acrylonitrile, methacrylonitrile, and the like; etc. in order to achieve desired effects.

The polymers should be produced such that they possess a glass transistion temperature of less than 50° C. and an average molecular weight of from about 1,000 to about 20,000, preferably of from about 3,000 to about 15,000.

Typically, the copolymers employed in the compositions of the instant invention are prepared by reacting a monomer feed mix (containing t-butyl acrylate, a polyfunctional acrylate, a comonomer having at least one active crosslinking site, and optionally other ethylenically unsaturated monomers) with a catalyst feed mixture at an elevated temperature.

The polymers of this invention may be prepared by any standard polymerization process including free radial, anionic, etc. However, a telomerization process wherein a monomer which is a chain transfer agent such as a mercaptan is incorporated into the copolymer is preferred. Illustrative of the mercaptan chain-transfer agents which may be employed are butyl mercaptan, mercaptoacetic acid, mercaptoethanol, 3-mercapto-1,2-propanediol and 2-methyl-2-propanethiol, t-dodecyl mercaptan, phenyl mercaptan, pentaerythritol tetramercaptopropionate, octyldecyl mercaptan, tetradecyl mercaptan, and the like.

The catalyst employed is typically a free radical initiator or a redox catalyst. One can mention, as merely illustrative of suitable catalysts which can be employed, free radicals initiators such as hydrogen peroxide, peracetic acid, t-butyl hydroperoxide, di-t-butyl peroxide, dibenzoyl peroxide, benzoyl hydroperoxide, 2,4-dichlorobenzoyl peroxide, 2,5-dimethyl-2,5-bis(hydroperoxy)hexane, perbenzoic acid, t-butyl peroxypivalate, t-butyl peracetate, azo-bis-iso-butyronitrile, ammonium persulfate, potassium persulfate, sodium perphosphate, potassium perphosphate, isopropyl peroxycarbonate, 2,2'-azobis(2,4-dimethylvaleronitrile) etc.; and redox catalyst systems such as sodium persulfate-sodium formaldehyde sulfoxylate, cumene hydroperoxide-sodium metabisulfite, hydrogen peroxide-ascorbic acid, sulfur dioxide-ammonium persulphate, etc.

The catalysts are employed in the usual catalytically effective concentrations which are known to those skilled in the art of emulsion polymerization.

The polymerization is typically carried out in the presence of an organic solvent which will not interfere with the polymerization reaction. Illustrative of the solvents which may be employed are ethoxyethyl acetate, methylene chloride, ethanol, iso-propanol, n-propanol, n-butanol, iso-butanol, tertbutanol; the methyl, ethyl, propyl or butyl esters of acetic acid, acetone, methyl ethyl ketone, benzene, toluene and the like.

The reaction may be carried out at a temperature of from about 50° C. to about 160° C., with a preferred temperature of from about 90° C. to about 130° C. The reaction may be performed as sub- or superatmospheric pressures, with atmospheric pressure being preferred.

Reaction time is not critical and may vary from less than several hours to several days or more depending upon the reaction batch size, pressure, temperature, etc. selected.

The coating compositions of this invention comprise mixtures of (1) the novel t-butyl acrylate/polyfunctional acrylate/functional monomer/(optionally other ethylenically unsaturated monomers) copolymer of the instant invention, (2) a suitable crosslinker and (3) suitable additives that are known to one skilled in the art of coating formulations. Illustrative of such additives are pigments and fillers, such as titanium dioxide, and the like; flow and leveling aids such as silcone surfactants, fluorocarbon based surfactants and the like; pigment dispersants; etc. These coating compositions may be blended by means well known to one skilled in the art. The novel compositions of this invention may be formulated into high solids coatings, i.e., as much as 75 weight percent or higher, although this figure may vary in accordance with the solvent selected, the viscosity desired, application temperature, etc.

The crosslinkers which may be employed will vary with the type of functional crosslinking sites on the copolymer employed. Thus, for copolymers containing active hydroxyl groups crosslinkers including polyepoxides (such as cycloaliphatic epoxides and diglycidyl epoxides), polyfunctional isocyanates, etherated amino-formaldehyde resins, etc. and mixtures thereof may be employed. For copolymers containing active carboxyl groups crosslinkers including including polyepoxides (such as cycloaliphatic epoxides and diglycidyl epoxides), aziridines, carbodiimides, etherated amino-formaldehyde resins, etc. and mixtures thereof may be employed. For copolymers containing active amide groups, crosslinkers including polyfunctional isocyanates, polyepoxides (such as cycloaliphatic epoxides and diglycidyl epoxides), etherated amino-formaldehyde resins, etc. and mixtures thereof may be employed. For copolymers which contain mixtures of active hydroxyl, carboxyl and/or amide groups, mixtures of suitable crosslinkers may be utilized. Preferred crosslinkers include polyepoxides and etherated amino-formaldehyde resins, as these crosslinkers are reactive with active hydroxyl, carboxyl and amide groups.

Illustrative of the polyfunctional isocyanates which may be employed for copolymers containing active hydroxyl and/or amide sites are 3,5,5-trimethyl-1-isocyanato-3-isocyanatomethylcyclohexane, di(2- isocyanatoethyl)-bicyclo(2.2.1)hept-5-ene-2,3-dicarboxylate, 2,4-tolylene diisocyanate, 2,6-tolylene diisocyanate, 4,4'-diphenylmethane diisocyanate, dianisidine diisocyanate, hexamethylene diisocyanate, the m- and p-xylylene diisocyanates, tetramethylene diisocyanate, dicyclohexyl-4,4'-methane diisocyanate, cyclohexane-1,4-diisocyanate, 1,5-naphthylene diisocyanate, 4,4'-diisocyanate diphenyl ether, 2,4,6-triisocyanate toluene, 4,4',4''-triisocyanate triphenyl methane, diphenylene-4,4-diisocyanate, the polymethylene polyphenylisocyanates and the like.

Illustrative of the polyepoxides which may be employed are the cycloaliphatic diepoxides which are described in U.S. Pat. No. 3,027,357, No. 2,890,194 and No. 2,890,197 (especially column 7, line 11 to column 7, line 38 of U.S. Pat. No. 3,027,357), including 3,4-epoxycyclohexylmethyl-3,4-epoxycyclohexane carboxylate, bis(3,4-epoxycyclohexylmethyl)adipate, bis(2,3-epoxycyclopentyl)ether, vinyl cyclohexene dioxide, 2-(3,4-epoxycyclohexyl)5,5-spiro-(2,3-epoxycyclohexane)-m-dioxane, bis(3,4-epoxycyclohexylmethyl)adipate, endo- and exo-dicyclopentadiene diepoxide, limonene diepoxide, and the like.

Illustrative of the amino-formaldehyde resins which are useful are hexakismethoxymethylmelamine, dimethylol ethylene urea, tetramethylol acetylene diurea, tris methoxymethylmelamine, various methyl, butyl, isobutyl ethers of melamine-formaldehyde adducts, various methyl, butyl, isobutyl ethers of benzoguanamine-formaldehyde.

In general, the amount of crosslinker which should be employed will be dependent on the equivalent weight of the crosslinker used, the inherent flexibility of the crosslinker used, the reactivity of the crosslinker with itself, and the degree of hardness/softness or flexibility desired in the final coating. These amounts will vary with particular functional monomer and crosslinker combination selected and will be known to one skilled in the art.

The catalyst employed in the crosslinking reaction, if indeed a catalyst is required for the given active site/crosslinker combination, will vary in accordance with the particular active site/crosslinker combination selected. The amounts and types of catalysts necessary will be well known to one skilled in the art. Thus, for example, with aminoplast crosslinkers catalysts such as p-toluene sulfuric acid, naphthalene sulfonic acid, phosphoric acid, dinonyl naphthalene disulfonic acid, or the stannous salt of trifluoromethane sulfuric can be used. With cycloaliphatic epoxides catalysts such as stannous octanoate, dibutyltin dilaurate, triflic acid, the reaction product of triflic acid and stannous oxide, diethyl ammonium triflate, etc. can be used.

The compositions of the instant invention may be used on surfaces for which acrylate-base coatings are suitable. They are especially suited for outdoor use as such use will best take adavntage of their enchanced humidity resistance.

EXAMPLES

The following examples are intended to further illustrate the invention and are not intended to limit the scope of the invention in any manner.

In the Comparative Experiments, Examples, and Table below the following abbreviations have been employed:
STY.=styrene
BA=n-butyl acrylate
t-BA=t-butyl acrylate
i-PA=isopropyl acrylate
HEA=hydroxyethyl acrylate
MMA=methyl methacrylate
EA=ethyl acrylate
TMPTA=trimethylol propane triacrylate

Comparative Experiment A

A cotelomer of t-butyl acrylate/ethyl acrylate/2-hydroxyethyl acrylate was prepared as follows. The cotelormerization was carried out in a 2-liter resin kettle equipped with a stirrer, reflux condenser, temperature controller, separate monomer and catalyst feed lines, and a sampling tube. A continuous feed process was used.

| Initial Charge | | Monomer Feed | |
|---|---|---|---|
| Ethoxyethyl acetate | 44 g. | t-Butylacrylate | 360 g. |
| | | Ethyl acrylste | 165 g. |
| Catalyst Feed | | 2-hydroxethyl | 75 g. |
| VAZO-52* | 10 g. | acrylate | |
| Ethoxyethyl | | Ethoxyethyl Acetate | 43 g. |
| acetate | 113 g. | t-dodecylmercaptan | 18 g. |

*VAZO-52 = 2,2'-azobis (2,4-dimethylvaleronitrile)

The ethoxyethyl acetate was charged to the kettle and heated to 115° C. The catalyst feed was started 5 minutes prior to the monomer feed. Both were fed over a 3 hour period with the temperature at 112°–122° C. The vehicle was cooled to 77° C. and dumped to give a slightly hazy, light amber colored residue product. Analysis of this residue product indicated that the solution contained 77.1% of the cotelomer. The solution of cotelomer had a Ubbelohde viscosity of 2951 cks at 30° C. and a glass transition temperature of 10° C. as measured by a differential scanning calorimeter. In order to test the effect of high humidity upon the stress-strain properties of the cotelomer produced, plaques containing such cotetomers were made as follows:

The residue product from Comparative Experiment A was filtered and blended with a crosslinking resin. The mixture was poured into a Teflon lined mold to give a dry film thickness of 22–26 mils.

| Comparative Experiment A (72.1%) | 50 g. |
|---|---|
| Cymel TM 325* | 15.45 g. |
| | 65.45 g. |

*A commercially available melamine formaldehyde resin, American Cyanamide

The plaques was dried at 60° C. for 16 hours at atmospheric pressure and then at 60° C. and 10 mm mercury pressure for 16 hours. The solid was then heated in a lab oven for 45 minutes at 150° C. Dogbone shaped samples were cut from the plaque and were aged one week at 22° C. and 55±2% relative humidity or at 22° C. and 90±2% relative humidity. Tensile strength and percent elongation at break were determined using an Instron test machine at a 26.7% minute$^{-1}$ elongation rate. Two to four duplicates were run under each test condition. The results of such testing are listed in Table I, below.

Example 1

A t-butyl acrylate/ethyl acrylate/hydroxyethyl acrylate/trimethylol propane triacrylate cotelomer was prepared using a procedure similar to that employed in Comparative Experiment A. The initial charge, monomer feed, and catalyst feeds were as follows:

| Initial Charge | | Monomer Feed | |
|---|---|---|---|
| Ethoxyethyl Acetate | 44 g. | t-Butyl Acrylate | 360 g. |
| | | Ethyl acrylate | 165 g. |
| | | 2-hydroxethyl acrylate | 75 g. |
| | | trimethylolpropane triacrylate | 6 g. |
| Initial Feed | | | |
| VAZO-52 | 10 g. | t-dodecylmercaptan | 18 g. |
| Ethoxyethyl acetate | 113 g. | Ethoxyethyl acetate | 43 g. |

Analysis of the residue product indicated that the solution produced contained 72.2 weight percent of the cotelomer. The solution of cotelomer had a Ubbelohde viscosity of 3807 cks at 30° C., and a glass transition temperature of −6° C. as measured by a differential scanning calorimeter. Plaques containing the cotelomer was prepared and tested in a manner similar to that described in Comparative Experiment A. The results of such testing are listed in Table I, below.

Example 2

A t-butyl acrylate/ethyl acrylate/hydoxyethyl acrylate/trimethylol propane triacrylate cotelomer was prepared using a procedure similar to that described in Comparative Experiment A. The initial charge, monomer feed, and catalyst feed were as follows:

| Initial Charge | | Monomer Feed | |
|---|---|---|---|
| Ethoxyethyl Acetate | 44 g. | t-Butyl Acrylate | 360 g. |
| | | Ethyl Acrylate | 165 g. |
| Catalyst Feed | | 2-hydroxyethyl acrylate | 75 g. |
| VAZO-52 | 10 g. | | |
| Ethoxyethyl Acetate | 113 g. | Trimethylolpropane triacrylate | 18 g. |
| | | t-Dodecyl mercaptan | 18 g. |
| | | Ethoxyethyl Acetate | 43 g. |

Analysis of the residue product indicated that the solution contained 69.9% of the cotelomer. The solution of cotelomer had a Ubbelohde viscosity of 3971 cks at 30° C. and a glass transition temperature of −6° C. as measured by a differential scanning calorimeter. Plaques containing the cotelomer were prepared and tested in a manner similar to that described in Comparative Experiment A. The results of such testing are listed in Table I, below.

TABLE I

| | | Tensile Strength, psi | | Elongation at Break, % | |
|---|---|---|---|---|---|
| Example | System | @ 55% RH | @ 90% RH | @ 55% RH | @ 90% RH |
| A | t-BA/EA/HEA No TMPTA | 2951 | 2471 | 5.6 | 22.5 |
| 1 | t-BA/EA/HEA 1% TMPTA | 6776 | 7333 | 4.7 | 7.6 |
| 2 | t-BA/EA/HEA 3% TMPTA | 5419 | 3930 | 10.4 | 9.6 |

The above results indicate that coatings which contain polymers incorporating polyfunctional acrylates possess increased humidity resistance relative to coatings which contain copolymers not incorporating polyfunctional acrylates. This is demonstrated by the high strength which such coatings possess at high humidity, i.e. 90 percent humidity.

Comparative Experiments B and C and

Examples 3 and 4

Several cotelomers were prepared in a manner similar to that described in Comparative Experiment A. These cotelomers contained the following monomers in the weight percents listed below:

| Example | Monomers (wt. %) | |
|---|---|---|
| B | STY | 20.0% |
| | t-BA | 8.5% |
| | i-PA | 59.0% |
| | HEA | 12.5% |
| C | STY | 21.0% |
| | MMA | 18.0% |
| | EA | 39.9% |
| | BA | 8.0% |
| | HEA | 13.1% |
| 3 | STY | 19.9% |
| | t-BA | 8.5% |
| | i-PA | 58.7% |
| | HEA | 12.4% |
| | TMPTA | 0.5% |
| 4 | STY | 19.8% |
| | t-BA | 8.4% |
| | i-PA | 58.4% |
| | HEA | 12.4% |
| | TMPTA | 1% |

Plaques containing these cotelomers were prepared and tested in a manner similar to that described in Comparative Experiment A. The results of such testing are listed in Table II below:

TABLE II

| | | Tensile Strength, psi | | Elongation at Break, % | |
|---|---|---|---|---|---|
| Example | System | @ 55% RH | @ 90% RH | @ 55% RH | @ 90% RH |
| B | STY/t-BA/i-PA/HEA No TMPTA | 973 | 1132 | 20.2 | 36.6 |
| C | STY/MMA/EA/BA/HEA No TMPTA | 742 | 702 | 34.7 | 81.3 |
| 3 | STY/t-BA/i-PA/HEA 0.5% TMPTA | 1791 | 1000 | 41.1 | 48.6 |
| 4 | STY/t-BA/i-PA/HEA 1% TMPTA | 6301 | 2129 | 37.3 | 15.4 |

The results in Table II indicate that humidity resistance is enhanced by the incorporation of t-butyl acrylate into the copolymers. The humidity resistance is further enhanced by the incorporation of a polyfunctional acrylate into the copolymer.

What is claimed is:

1. A copolymer which has been produced by bulk polymerization, comprised of:
   (a) from about 10 to about 95 weight percent of t-butyl acrylate;
   (b) from about 0.1 to about 3 weight percent of a polyfunctional acrylate that is an ester of acrylic acid or methacrylic acid which possesses two or more ethylenically unsaturated double bonds;
   (c) from about 1 to about 30 weight percent of at least one ethylenically unsaturated functional comonomer which is copolymerizable with said t-butyl acrylate and said polyfunctional acrylate, said at least one ethylenically unsaturated functional comonomer containing at least one crosslinking site selected from the group consisting of carboxyl, hydroxyl, amide and mixtures thereof;
   (d) from 0 to about 80 weight percent of at least one other ethylenically unsaturated monomer which is capable of polymerizing with said t-butyl acrylate and polyfunctional acrylate.

2. The copolymer of claim 1 wherein t-butyl acrylate is present in an amount of from about 25 to about 75 weight percent.

3. The copolymer of claim 1 wherein t-butyl acrylate is present in an amount of from about 30 to about 60 weight percent.

4. The copolymer of claim 1 wherein the polyfunctional acrylate is present in an amount of from about 0.5 to about 2 weight percent.

5. The copolymer of claim 1 wherein the polyfunctional acrylate is trimethylol propane triacrylate.

6. The copolymer of claim 1 wherein the functional comonomer is present in an amount of from about 5 to about 20 weight percent.

7. The copolymer of claim 1 wherein the functional comonomer is one of acrylic acid, methacrylic acid, hydroxyethyl acrylate, hydroxyethyl methacrylate, hydroxypropyl acrylate, hydroxypropyl methacrylate and mixtures thereof.

8. The copolymer of claim 1 wherein other ethylenically unsaturated monomers, component (d), are present in an amount of from about 5 to about 60 weight percent.

9. A copolymer comprised of:
   (a) from about 30 to about 60 weight percent t-butyl acrylate;
   (b) from about 0.5 to about 2 weight percent trimethylol propane triacrylate;
   (c) from about 5 to about 20 weight percent of one of acrylic acid, methacrylic acid, hydroxyethyl acrylate, hydroxyethyl methacrylate, hydroxypropyl acrylate, hydroxypropyl methacrylate and mixtures thereof; and
   (d) from about 5 to about 60 weight percent of other ethylenically unsaturated monomers which are capable of polymerizing with t-butyl acrylate and polyfunctional acrylates.

* * * * *